United States Patent
Satoh

(10) Patent No.: US 12,445,516 B2
(45) Date of Patent: Oct. 14, 2025

(54) INFORMATION PROCESSING APPARATUS, CONTROL METHOD FOR INFORMATION PROCESSING APPARATUS, AND STORAGE MEDIUM THAT ALLOW USER TO EASILY UNDERSTAND EXTENT TO WHICH FILE TRANSFERS HAVE SUCCEEDED AND FAILED IN OVERALL PROGRESS DISPLAY

(71) Applicant: CANON KABUSHIKI KAISHA, Tokyo (JP)

(72) Inventor: Masahiro Satoh, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 18/408,065

(22) Filed: Jan. 9, 2024

(65) Prior Publication Data

US 2024/0236170 A1 Jul. 11, 2024

(30) Foreign Application Priority Data

Jan. 11, 2023 (JP) ................................ 2023-002469

(51) Int. Cl.
*H04L 67/06* (2022.01)
*G06F 9/451* (2018.01)
*H04L 67/75* (2022.01)

(52) U.S. Cl.
CPC .............. *H04L 67/06* (2013.01); *G06F 9/451* (2018.02); *H04L 67/75* (2022.05)

(58) Field of Classification Search
CPC .......... H04L 67/06; H04L 67/75; G06F 9/451
See application file for complete search history.

(56) References Cited

U.S. PATENT DOCUMENTS

| | | | |
|---|---|---|---|
| 2015/0253946 A1* | 9/2015 | Chandrasekaran | G06F 3/04883 715/748 |
| 2018/0234562 A1* | 8/2018 | Kamekawa | H04N 1/32614 |
| 2021/0120073 A1* | 4/2021 | Qu | G06F 16/168 |
| 2021/0346797 A1* | 11/2021 | Tsuchikawa | A63F 13/48 |

(Continued)

FOREIGN PATENT DOCUMENTS

| | | | | |
|---|---|---|---|---|
| CN | 108234539 A | * | 6/2018 | ............. H04L 67/06 |
| JP | 2009-124315 A | | 6/2009 | |

*Primary Examiner* — Oanh Duong
(74) *Attorney, Agent, or Firm* — Cowan, Liebowitz & Latman, P.C.

(57) ABSTRACT

An information processing apparatus allowing a user to easily understand the extent to which file transfers have succeeded and failed is provided. The information processing apparatus including a display part capable of displaying an overall progress of a transfer processing of transferring transfer files received to a file server includes an integration part that obtains integrated values of successes and failures of the transfer processing, a storage part that stores the integrated values of successes and failures obtained by the integration part, and a display control part that reads out the integrated values of successes and failures, causes the display part to perform a display corresponding to the integrated value of successes in a certain direction from a start point side, and causes the display part to perform a display corresponding to the integrated value of failures in a direction opposite to the certain direction from an end point side.

13 Claims, 10 Drawing Sheets

(56) References Cited

U.S. PATENT DOCUMENTS

| | | | |
|---|---|---|---|
| 2021/0349586 A1* | 11/2021 | Tsuchikawa | A63F 13/5375 |
| 2023/0120344 A1* | 4/2023 | Pollakowski | G06F 16/172 |
| | | | 709/219 |

* cited by examiner

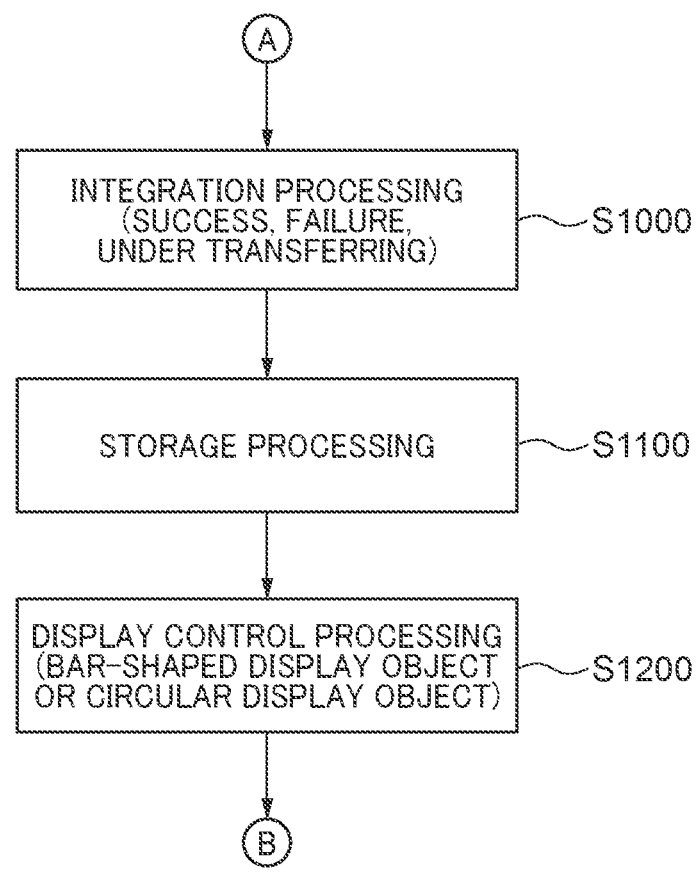

INFORMATION PROCESSING APPARATUS, CONTROL METHOD FOR INFORMATION PROCESSING APPARATUS, AND STORAGE MEDIUM THAT ALLOW USER TO EASILY UNDERSTAND EXTENT TO WHICH FILE TRANSFERS HAVE SUCCEEDED AND FAILED IN OVERALL PROGRESS DISPLAY

BACKGROUND OF THE INVENTION

Field of the Invention

The present invention relates to an information processing apparatus including a display part that displays an overall progress of a transfer processing of transmitting and transferring transfer files received from an electronic device to a file server, a control method for the information processing apparatus, and a storage medium.

Description of the Related Art

At the time of executing file transfers, in order to easily notify a user of an overall transfer status, the progress of the file transfers is displayed. In addition, an apparatus having a function of individually displaying "success" and "failure" in each file transfer processing separately from the overall progress display is also known.

As an example, according to an information processing system described in Japanese Laid-Open Patent Publication (kokai) No. 2009-124315, the following technique has been proposed. The information processing system includes a multifunction peripheral (an MFP) that transmits image data and a client personal computer (a client PC) that instructs the MFP to transmit the image data, and the MFP and the client PC are connected via a network. In addition, the client PC includes a hard disk drive (an HDD) that stores a transmission history including image data that the MFP is instructed to transmit for each transmission job, and a history data generation part that generates a thumbnail image by converting the image data of the stored transmission history into a thumbnail. Furthermore, the client PC includes a display data control part that displays the thumbnail image generated by the history data generation part.

According to the technique disclosed in Japanese Laid-Open Patent Publication (kokai) No. 2009-124315, in the case that a transmission history of a FAX job or the like is displayed, an image included in the transmission history is converted into a thumbnail, and the transmission history in a history list is displayed by distinguishing specific conditions such as a transmission result. With this configuration, specific information can be quickly searched from the transmission history.

However, according to the technique disclosed in Japanese Laid-Open Patent Publication (kokai) No. 2009-124315, although consideration has been given to converting into the thumbnail, there is no disclosure of a method for the user to intuitively understand whether the transmission corresponding to the transmission history has "succeeded" or "failed". As a result, the prior art has the following problems.

That is, in the configuration in which "the overall progress" and "an individual result confirmation screen" are displayed separately, the display merely shows the progress of the processed data. As a result, it is not possible to understand the details of "success" and "failure" in the file transfer processing. For example, although it is possible to individually confirm information about "failure" on "the individual result confirmation screen", there is a problem that the user cannot easily confirm a status of the overall progress (an overall progress status).

In addition, in the configuration in which file transfer results of the overall progress status are sequentially displayed in time series, there is also a problem that the user cannot intuitively understand a percentage of "success" and a percentage of "failure" in the total. Furthermore, in the configuration in which in the overall progress, the file transfer results are integrated and displayed for each status, a display position of "failure" moves each time "success" increases. For this reason, there is also a problem that the user cannot intuitively understand whether or not "failure" has increased by the update of the progress status. In particular, in the case that a large amount of progress status is updated at a fine frequency, this problem has become remarkable.

SUMMARY OF THE INVENTION

The present invention provides an information processing apparatus, a control method for the information processing apparatus, and a storage medium that allow a user to easily understand the extent to which file transfers have succeeded and failed in an overall progress display.

Accordingly, the present invention provides an information processing apparatus including a display part capable of displaying an overall progress of a transfer processing of transmitting and transferring transfer files received from an electronic device to a file server, the information processing apparatus comprising at least one processor, and a memory coupled to the processor storing instructions that, when executed by the processor, cause the processor to function as an integration part that obtains an integrated value of successes and an integrated value of failures of the transfer processing of transmitting the received transfer files to the file server, a storage part that stores the integrated value of successes and the integrated value of failures, which are obtained by the integration part, and a display control part that reads out the integrated value of successes and the integrated value of failures from the storage part, causes the display part to perform a display corresponding to the integrated value of successes, which has been read out, in a certain direction from a start point side, and causes the display part to perform a display corresponding to the integrated value of failures, which has been read out, in a direction opposite to the certain direction from an end point side.

According to the present invention, it is possible to obtain the effect that it is possible to provide the information processing apparatus, the control method for the information processing apparatus, and the storage medium that allow the user to easily understand the extent to which file transfers have succeeded and failed in the overall progress display.

Further features of the present invention will become apparent from the following description of exemplary embodiments with reference to the attached drawings.

BRIEF DESCRIPTION OF THE DRAWINGS

FIG. 10 is an example of a flowchart that shows a processing according to the embodiment of the present invention.

DESCRIPTION OF THE EMBODIMENTS

The present invention will now be described in detail below with reference to the accompanying drawings showing embodiments thereof.

Hereinafter, an embodiment of the present invention will be described in detail with reference to the drawings. However, the configuration described in the following embodiment is merely an example, and the scope of the present invention is not limited to the configuration described in the embodiment.

Figure 1:
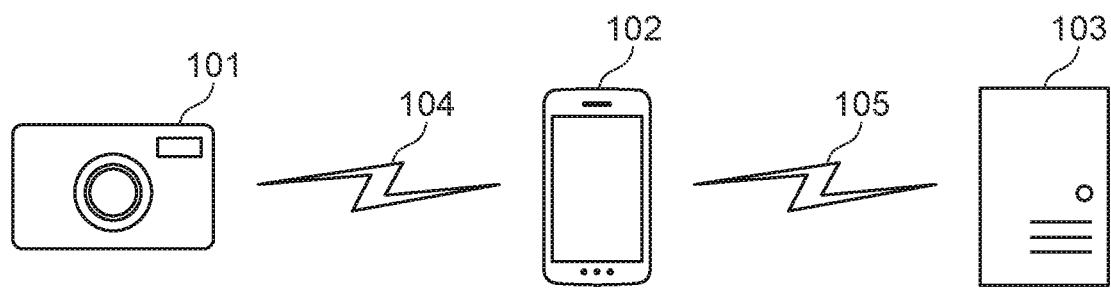
FIG. 1 is a schematic explanatory diagram of a configuration example of a file transfer system according to an embodiment of the present invention.

FIG. 1 is a schematic explanatory diagram that shows a configuration example of a file transfer system according to the embodiment of the present invention. As shown in FIG. 1, the file transfer system includes an image pickup apparatus 101, an information processing apparatus 102, and a file server 103. The image pickup apparatus 101 and the information processing apparatus 102 are connected to each other by a network 104 so as to be able to communicate necessary information with each other. Similarly, the information processing apparatus 102 and the file server 103 are connected to each other by a network 105 so as to be able to communicate necessary information with each other.

The image pickup apparatus 101 stores data for performing file transfers. The information processing apparatus 102 is a computer (PC), a smart device, or the like used by a user, and is an apparatus having a file transfer function in which an application having a progress status display function according to the embodiment of the present invention is installed. The information processing apparatus 102 may be, for example, a mobile terminal such as a smartphone or a tablet terminal. The file server 103 is an information processing apparatus represented by a sharing site on the Internet, a cloud storage, or the like. The file server 103 is an information processing apparatus for enabling image storage, image sharing, etc., and is a server in which programs for the image storage, the image sharing, etc., are installed.

The network 104 is a network for communicably connecting the image pickup apparatus 101 and the information processing apparatus 102. The network 104 also includes an independent network environment such as a local area network (LAN). The network 104 may be wired or wireless, or a part thereof may be wired or wireless. In short, it is sufficient that the necessary information can be communicated between the image pickup apparatus 101 and the information processing apparatus 102. For example, the Internet or the like may be used.

The network 105 is a network for communicably connecting the information processing apparatus 102 and the file server 103. Examples of the network 105 include the Internet, an intranet, a mobile line, and the like. The network 105 may be wired or wireless, or a part thereof may be wired or wireless. In short, it is sufficient that the necessary information can be communicated between the information processing apparatus 102 and the file server 103. In addition, the network 105 also includes connection devices such as a network hub, a wireless router, and a mobile router, communication devices, etc.

Figure 2:
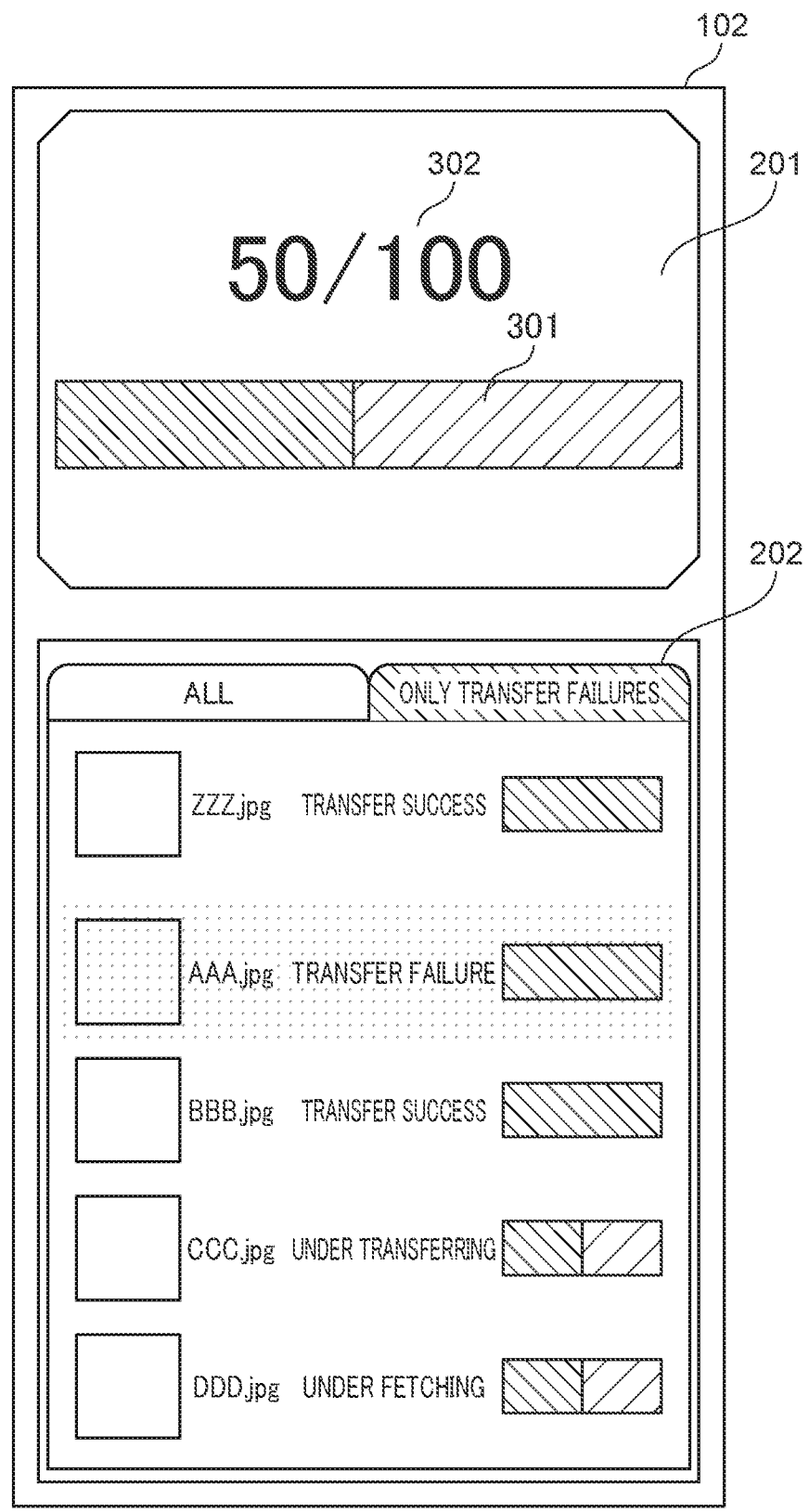
FIG. 2 is an explanatory diagram of a progress status display example of an application in the embodiment of the present invention.

FIG. 2 is an explanatory diagram of a progress status display example of the application in the embodiment of the present invention. FIG. 2 shows a progress status display example in the information processing apparatus 102 such as a computer or a smart device having the progress status display function according to the embodiment of the present invention. It should be noted that the following displays shown in FIGS. 2 to 9 are realized by a processor (not shown) (a central processing unit (CPU), a digital signal processor (DSP), or the like) included in the information processing apparatus 102 executing a program recorded in a nonvolatile memory (not shown) such as a read only memory (ROM).

Reference numeral "201" is a display range (a display area) on which an overall status of a file transfer processing is displayed by a progress or the like. Reference numeral "301" is a progress display that indicates "success" and "failure" in an overall progress in the embodiment of the present invention, and reference numeral "302" indicates a total amount of the overall progress of the file transfers. "50/100", which is an example shown in FIG. 2, indicates that "50" file transfers in "100" file transfers are completed.

Reference numeral "202" is a display range (a display area) on which processing statuses of files (transfer files) during the file transfer processing are displayed. On the display area indicated by reference numeral "202", some of transfer results are displayed together with thumbnails of the transfer files. On the display area indicated by reference numeral "202", various kinds of "transfer statuses" are displayed, the "transfer statuses" include "under fetching", "under transferring", "transfer success", and "transfer failure", and any one of the "transfer statuses" (the "under fetching", the "under transferring", the "transfer success", and the "transfer failure") is displayed for the transfer file. Specifically, the "under fetching" means a status indicating that the file transfer is "under fetching" in the network 104, and the "under transferring" means a status indicating that the file transfer is "under transferring" in the network 105.

Furthermore, in the "transfer status", the "transfer success" is displayed when the transfer (the file transfer) from the information processing apparatus 102 to the file server 103 is completed, and the "transfer failure" is displayed when an error occurs during fetching or during transferring in the file server 103. In addition, it becomes possible to confirm failed files by separately displaying a list of only files displayed as the "transfer failure".

In this way, since the thumbnail indicating the transfer file and the thumbnail indicating the corresponding transfer status can be displayed together, the user is able to easily confirm the transfer status of the file (the transfer file). In the example shown in FIG. 2, the transfer status of a file "ZZZ.jpg" and the transfer status of a file "BBB.jpg" are the "transfer success", and the transfer status of a file "AAA.jpg" is the "transfer failure". In addition, the transfer status of a file "CCC.jpg" is the "under transferring", and the transfer status of a file "DDD.jpg" is the "under fetching".

Figure 3:
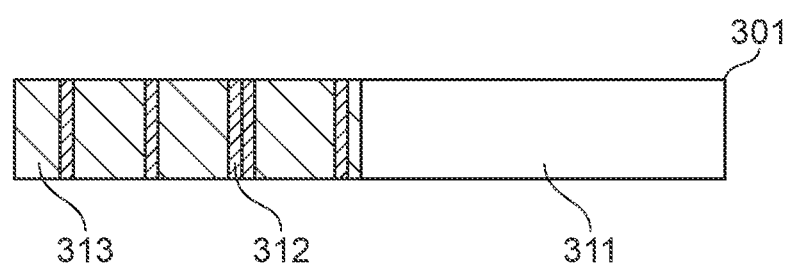
FIG. 3 is an explanatory diagram of a conventional overall progress display example 1.

FIG. 3 is an explanatory diagram of a conventional overall progress display example 1. FIG. 3 is an example of the progress display that indicates "success" and "failure" in the overall progress and is indicated by reference numeral "301". Reference numeral "301" is a progress bar indicating the total amount of the overall progress. Reference numeral "311" indicates "unprocessed" in the overall progress. In addition, reference numeral "312" indicates "failure" in the overall progress, and reference numeral "313" indicates "success" in the overall progress.

The conventional overall progress display example 1 shown in FIG. 3 is an example in which "success" and "failure" of the transfer results are displayed in processing order. In this case, although the user is able to roughly recognize the progress status and the statuses of the transfer results, it is not possible for the user to easily understand a percentage of "success" and a percentage of "failure" to the total.

Figure 4:
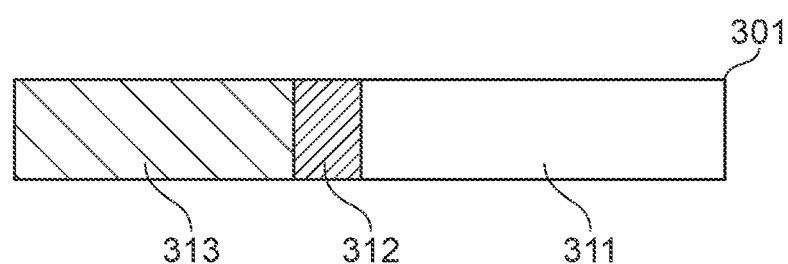
FIG. 4 is an explanatory diagram of a conventional overall progress display example 2.

FIG. 4 is an explanatory diagram of a conventional overall progress display example 2. FIG. 4 is an example in which each of "success" and "failure" of the transfer results is integrated and displayed. In this case, since "success" and "failure" of the transfer results are each displayed in an integrated manner, it is possible to recognize the percentage of "success" and the percentage of "failure" to the total. However, when "success" is increased by the update of the progress, a display position of "failure" moves, and thus, it is not possible for the user to intuitively understand whether or not "failure" has increased. In particular, in the case that a large number of progress updates are performed frequently, it becomes more difficult for the user to intuitively understand whether or not "failure" has increased.

Figure 5:
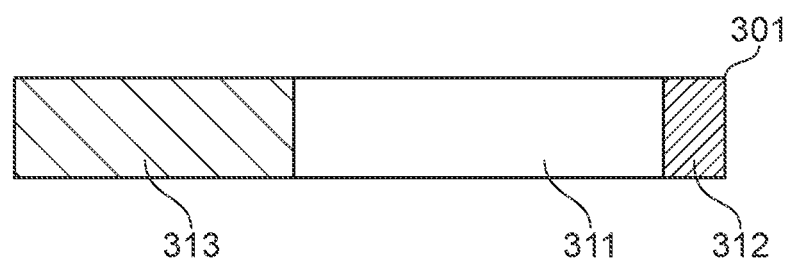
FIG. 5 is an explanatory diagram of an overall progress display example 1 in the embodiment of the present invention.

FIG. 5 is an explanatory diagram of an overall progress display example 1 in the embodiment of the present invention. In FIG. 5, the integration of "success" in the embodiment of the present invention is displayed from a start point side (the left end of the overall progress display progress bar 301). On the other hand, the integration of "failure" in the embodiment of the present invention is displayed from an end point side (the right end of the overall progress display progress bar 301). In this case, "unprocessed" of reference numeral "311" is displayed between the display of "success" of reference numeral "313" and the display of "failure" of reference numeral "312". In the case of such a display, since both the integration of "success" of the file transfer results and the integration of "failure" of the file transfer results are displayed from fixed locations (fixed positions), the user is able to easily recognize the percentage of "success" and the percentage of "failure" in the overall progress status.

Figure 6:
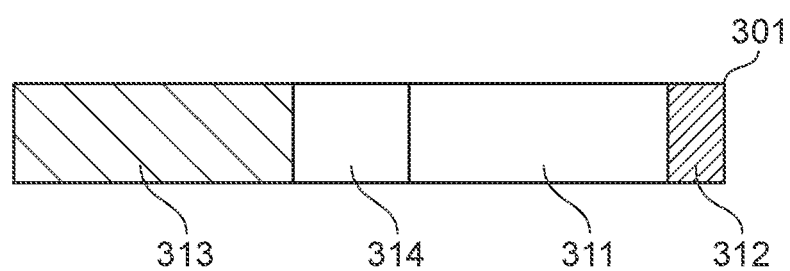
FIG. 6 is an explanatory diagram of an overall progress display example 2 in the embodiment of the present invention.

FIG. 6 is an explanatory diagram of an overall progress display example 2 in the embodiment of the present invention. FIG. 6 shows a display example in a case that information about "under transfer processing" of reference numeral 314 is also added in the overall progress display example 1 shown in FIG. 5. It should be noted that the "under transfer processing" includes the "under fetching" and the "under transferring". In this case, the user is able to easily understand all the "transfer statuses" also including "unprocessed" of reference numeral 311. In addition, by displaying the display of the "under transfer processing" in a manner of displaying the "under fetching" and the "under transferring" separately, it becomes also possible to display all the transfer statuses.

As shown in FIG. 6, even in the case that the "transfer statuses" are displayed in detail, the integration of "success" is displayed from the start point side (the left end of the overall progress display progress bar 301), and the integration of "failure" is displayed from the end point side (the right end of the overall progress display progress bar 301). As a result, since the integration of "success" of the file transfer results and the integration of "failure" of the file transfer results are displayed from the fixed locations (the fixed positions), the user is able to easily recognize the percentage of "success" and the percentage of "failure" to the total amount.

Figure 7:
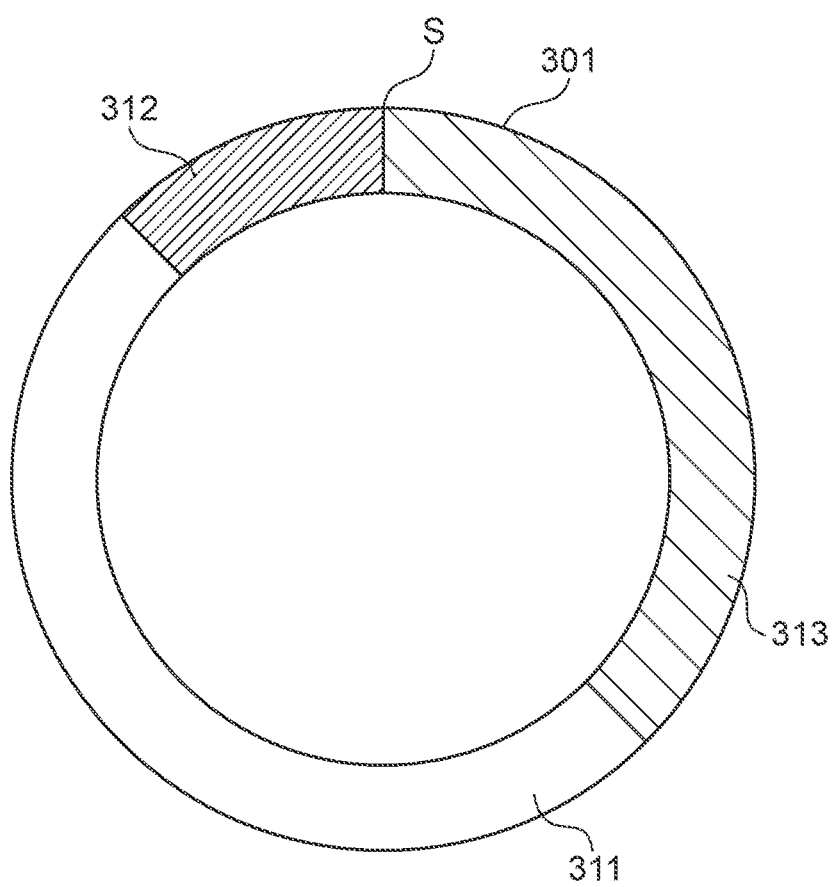
FIG. 7 is an explanatory diagram of another mode of the overall progress display of FIG. 5.

FIG. 7 is an explanatory diagram of another mode of the overall progress display of FIG. 5. FIG. 7 shows a display example in which the overall progress display progress bar 301 of FIG. 5 is displayed in a circle shape (a circular shape). A "start point" for the display of the integration of "success" and the display of the integration of "failure" is set to the position of "12 o'clock (see reference numeral S)". From this "start point", the integration of "success" is displayed in the "clockwise direction" (reference numeral 313), and the integration of "failure" is displayed in the "counterclockwise direction" (reference numeral 312). As a result, the user is able to intuitively and immediately understand a ratio of "success" and a ratio of "failure" to the total and the percentage of "success" and the percentage of "failure" in the overall progress status. It should be noted that FIG. 7 is the example in which the overall progress display progress bar of FIG. 5 is displayed in a circle shape (a circular shape).

Figure 8:
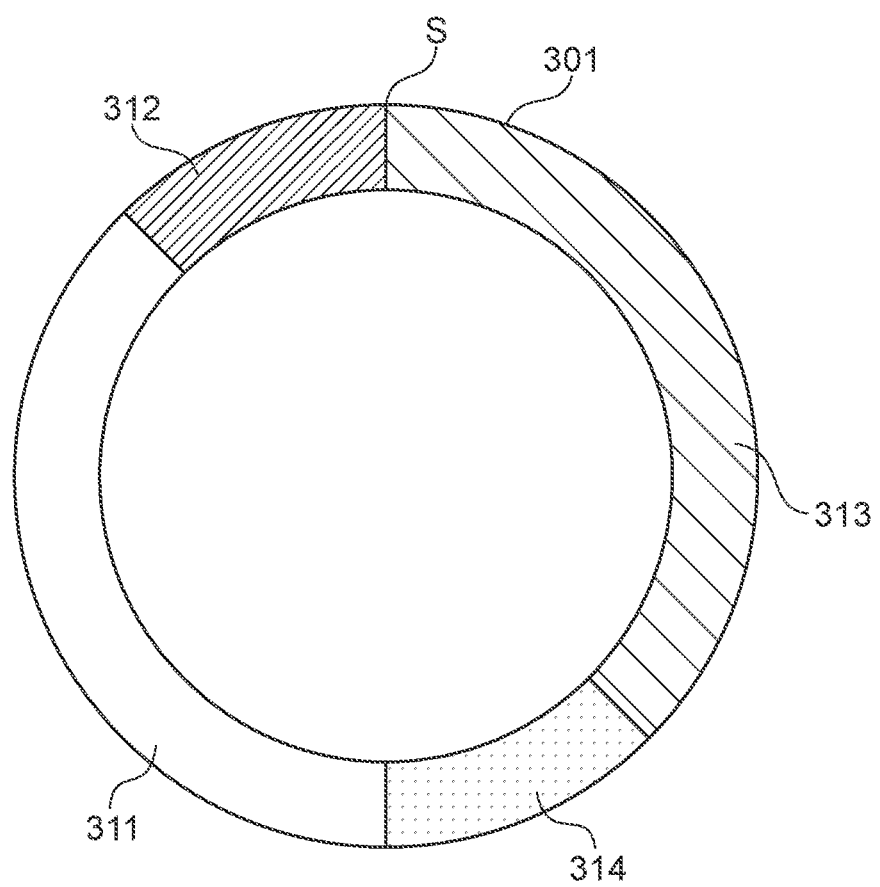
FIG. 8 is an explanatory diagram of another mode of the overall progress display of FIG. 6.
Figure 9:
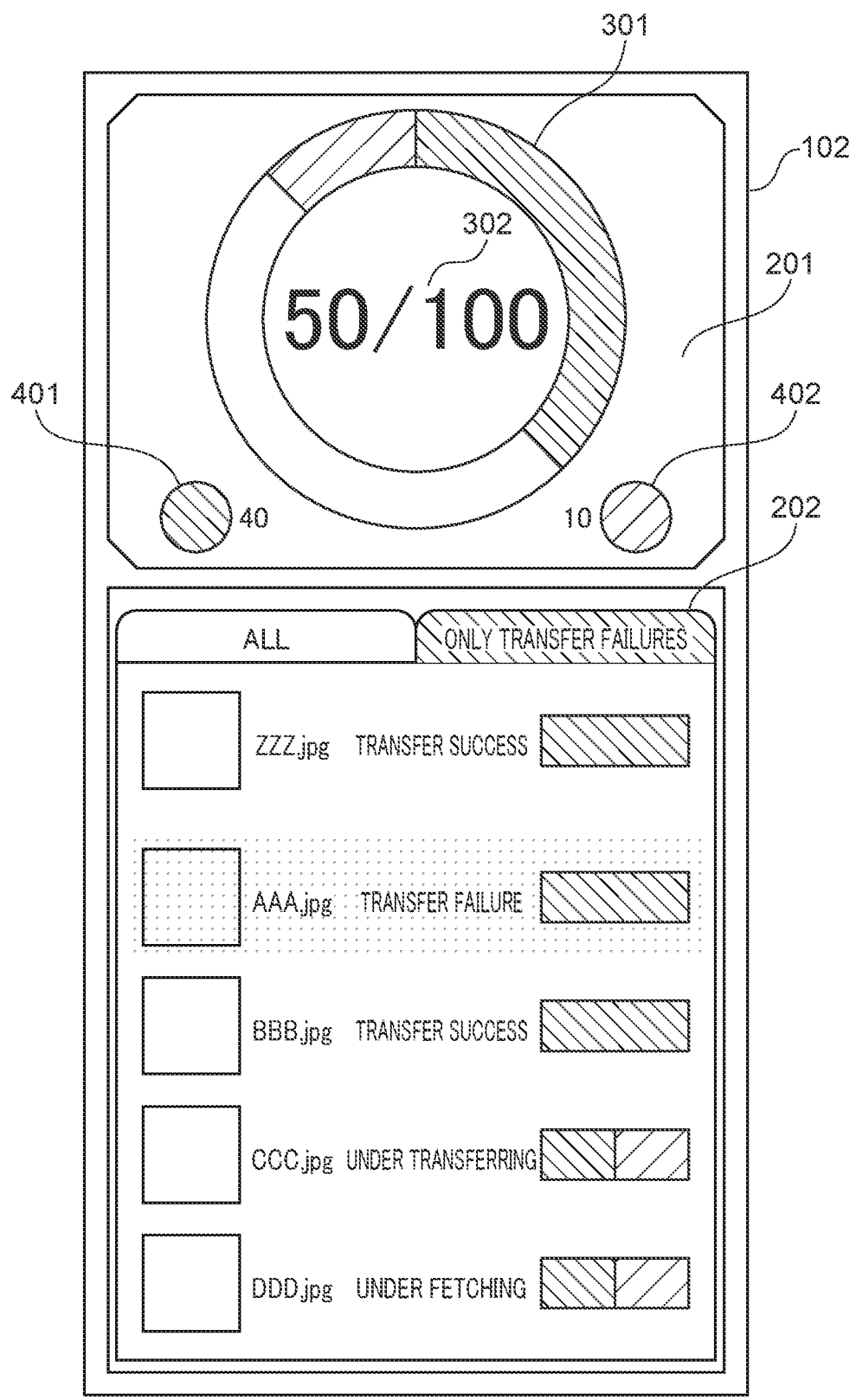
FIG. 9 is an explanatory diagram of a status display example in which the number of processed files is additionally displayed in the overall progress display of FIG. 7.

Similarly, FIG. 8 is an explanatory diagram of another mode of the overall progress display of FIG. 6. FIG. 8 shows a display example in which the overall progress display progress bar 301 of FIG. 6 is displayed in a circle shape. Also in FIG. 8, a "start point" for the display of the integration of "success" and the display of the integration of "failure" is set to the position of "12 o'clock (see reference numeral S)". From this "start point", the integration of "success" is displayed in the "clockwise direction" (reference numeral 313), and the integration of "failure" is displayed in the "counterclockwise direction" (reference numeral 312). It should be noted that FIG. 8 shows a display example in the case that the information about the "under transfer processing" indicated by reference numeral 314 is also added. As shown in FIGS. 8 and 9, in the case that the circle-shaped overall progress display progress bar 301 is displayed, the position of 12 o'clock (see reference numeral S) of the circle-shaped display object becomes the start point and the end point.

FIG. 9 shows a display example of the overall transfer status in which the number of processed files is additionally displayed in a circle-shaped overall progress display part of FIG. 7. Reference numeral 201 is an "overall progress display part" for displaying the overall progress. The total amount (the overall progress status) of the file transfers indicated by reference numeral 302 is displayed to be superimposed inside the overall progress display part 201, particularly inside the circle-shaped overall progress display part. In the example shown in FIG. 9, "50/100" is displayed to indicate that 50 file transfers of "success" and "failure" among 100 file transfers have been performed.

With such a display mode, the user becomes able to more easily understand the overall file transfer progress status. In particular, in the case that the circle-shaped overall progress display part is enlarged, the user becomes able to more easily understand the percentage of "success" and the percentage of "failure" in the overall progress status. Furthermore, the actual number of "successes" and the actual number of "failures" can be displayed on the overall progress display part 201 as indicated by reference numeral 401 and reference numeral 402, respectively.

In the display example of FIG. 9, the number of "successes" is "currently 40" as indicated by reference numeral 401, and the number of "failures" is "currently 10" as indicated by reference numeral 402. When the actual "number of successes" and the actual "number of failures" are displayed in this manner, the user becomes able to further easily understand the progress status. It should be noted that, similar to FIG. 2, some of the transfer results are displayed together with the thumbnails of the transfer files at reference numeral "202" below the "overall progress display part 201" shown in FIG. 9.

As described above, according to the embodiment of the present invention, in the overall progress display, the percentage of "success", the percentage of "failure", the amount of "successes", and the amount of "failures" with respect to the entire progress amount (the total amount of the overall progress) are displayed. As a result, the user becomes able to easily understand the total number of pieces of transfer data, and the number of "successes" and the number of "failures" among the transfer data.

FIG. 10 is an example of a flowchart that shows a processing according to the embodiment of the present invention. The processing according to the embodiment of the present invention is performed by the processor such as the CPU included in the information processing apparatus 102, and uses a memory (not shown) such as a random access memory (RAM), a display part such as a liquid crystal display or an electroluminescent display (an EL display), etc. In addition, the CPU is capable of displaying, on the display part, the overall progress of the transfer processing of transmitting and transferring the transfer files received from the image pickup apparatus 101 (an electronic device) to the file server 103. The CPU repeatedly executes the processing shown in FIG. 10 at every predetermined period of time. It should be noted that, in this processing example, the files "under fetching" are not assumed.

As shown in FIG. 10, first, in S1000, the CPU (an integration part) executes an integration processing. Specifically, the CPU obtains integrated values obtained by integrating "successes" and "failures" of the transfer processing of transmitting the transfer files received from the image pickup apparatus 101 to the file server 103. It should be noted that the CPU may obtain an integrated value of "under transferring" to the file server 103. In addition, when the integrated value of the "number of successes" and the integrated value of the "number of failures" (and the integrated value of "under transferring") are subtracted from the total number of the transfer files received from the image pickup apparatus 101, the number of "unprocessed" transfer files (an integrated value of "unprocessed") is obtained.

Next, in S1100, the CPU (a storage part) executes a storage processing. Specifically, the CPU temporarily stores the integrated value of "successes" and the integrated value of "failures", which are obtained in S1000, in the RAM.

Next, in S1200, the CPU (a display control part) executes a display control processing. The CPU reads out the integrated value of "successes" and the integrated value of "failures" from the RAM. Then, the CPU causes the display part to perform a display corresponding to the integrated value of "successes", which has been read out, in a certain direction from the start point side, and also causes the display part to perform a display corresponding to the integrated value of "failures", which has been read out, in a direction opposite to the certain direction from the end point side. For example, as described with reference to FIG. 5, the CPU sets the left end (one end side) of the overall progress display progress bar 301 (a bar-shaped display object) as the start point side, and sets the right end (the other end side) of the overall progress display progress bar 301 (the bar-shaped display object) as the end point side.

Then, the CPU causes the display part to perform a display of the bar with a length corresponding to the "number of successes", which has been read out, from the left end in the right direction of the drawing (in one direction) in which the overall progress display progress bar 301 (the bar-shaped display object) extends. At the same time, the CPU causes the display part to perform a display of the bar with a length corresponding to the integrated value of "failures", which has been read out, from the right end (the other end side) in the left direction of the drawing (in a direction opposite to the above-described one direction).

Thus, the progress display described with reference to FIG. 5 is performed. It should be noted that the CPU may make a display color that causes the display part to perform the display corresponding to the integrated value of "successes" differ from a display color that causes the display part to perform the display corresponding to the integrated value of "failures". Furthermore, the CPU may cause the display part to display "the unprocessed section (the unprocessed display section 311)", which is displayed between the display corresponding to the integrated value of "successes" and the display corresponding to the integrated value of "failures", in a display color different from the above-described display colors.

In addition, as shown in FIG. 6, the CPU causes the display part to perform the display corresponding to the integrated value of "successes", and also causes the display part to perform the display corresponding to the integrated value of "failures". At this time, the CPU is also capable of causing the display part to perform a display corresponding to the integrated value of "unprocessed file transfer (311)" and a display corresponding to the integrated value of "under file transferring (314)" at a display area sandwiched between the display corresponding to the integrated value of "successes" and the display corresponding to the integrated value of "failures". It should be noted that the CPU is also capable of displaying the display under file transferring so as to be in contact with the display corresponding to the integrated value of "successes", which is displayed on the display part. According to each display mode described above, the user becomes able to more easily understand the percentage of "success", the percentage of "failure", and the percentage of "under transferring" in the overall progress status.

In addition, the CPU sets the position of 12 o'clock of the circle-shaped display object as the start point of the start point side and the start point of the end point side (see "reference numeral S"), and causes the display part to perform the display corresponding to the integrated value of "successes", which has been read out from the RAM, in the clockwise direction (or in the counterclockwise direction) from the position of 12 o'clock. At the same time, the CPU is capable of causing the display part to perform the display corresponding to the integrated value of "failures", which has been read out from the RAM, in the counterclockwise direction (or in the clockwise direction) from the position of 12 o'clock. Thus, even according to the display mode of displaying "success" and "failure" in a circle shape, the user becomes able to easily understand the percentage of "success" and the percentage of "failure" in the overall progress status.

Furthermore, as shown in FIG. 9, the CPU is also capable of being configured to display the total amount of the overall progress of the file transfers on the display part so as to be superimposed on the circle-shaped display object (301). In FIG. 9, characters "50/100" are displayed, and the user is able to easily understand that 50 file transfers of "success" and "failure" among 100 file transfers have been executed.

In addition, as shown in FIG. 9, the CPU may display a number corresponding to the integrated value of "successes" that has been read out from the RAM together with the circle-shaped display object (301) (see reference numeral 401). Similarly, the CPU is also capable of displaying a number corresponding to the integrated value of "failures" that has been read out from the RAM on the display part (see reference numeral 402). In the example of FIG. 9, as described above, the number of "successes" is "currently 40" as indicated by reference numeral 401, and the number of "failures" is "currently 10" as indicated by reference numeral 402. Thus, according to various kinds of display modes, the user becomes able to more easily understand the percentage of "success" and the percentage of "failure" in the overall progress status.

Although the embodiment of the present invention has been described above, the present invention is provided by a system, an apparatus, a method, etc. In addition, the processing (the functions) of the present invention can be realized as follows. That is, a recording medium (a storage medium), in which a computer program for realizing the functions of the above-described embodiment is recorded, is supplied to a system, an apparatus, or the like. Then, a computer (a processor such as a CPU, a micro processing unit (MPU), or a DSP) included in the system, the apparatus, or the like reads out and executes the computer program recorded in the recording medium. Thus, various kinds of displays described above and the functions of the file transfers, etc. are realized.

In addition, the overall progress display progress bar may be set to have another shape. For example, the overall progress display progress bar may be a quadrangle such as a square or a rectangle. In this case, an intermediate position of the upper side of the quadrangle may be set as the start point of "success" and the end point of "failure", and a display direction corresponding to the number of "successes" and a display direction corresponding to the number of "failures" may be in opposite directions. Furthermore, in the case that the percentage of the integrated value of "failures" to the total number of the file transfers is large (for example, in the case that the percentage of the integrated value of "failures" to the total number of the file transfers is equal to or greater than a predetermined threshold value), it is also possible to perform a display indicating that the transfer processing is not going well (is not successful) to alert the user (call the user's attention).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-002469, filed on Jan. 11, 2023, which is hereby incorporated by reference herein in its entirety.

What is claimed is:

1. An information processing apparatus including a display part capable of displaying an overall progress of a transfer processing of transmitting and transferring transfer files received from an electronic device to a file server, the information processing apparatus comprising:
   at least one processor; and
   a memory coupled to the processor storing instructions that, when executed by the processor, cause the processor to function as:
   an integration part that obtains an integrated value of successes and an integrated value of failures of the transfer processing of transmitting the received transfer files to the file server;
   a storage part that stores the integrated value of successes and the integrated value of failures, which are obtained by the integration part; and
   a display control part that reads out the integrated value of successes and the integrated value of failures from the storage part, causes the display part to perform a first display corresponding to the integrated value of successes, which has been read out, and changing a progression of the first display in a certain direction from a start point side based on the integrated value of successes, and causes the display part to perform a second display corresponding to the integrated value of failures, which has been read out, and changing a progression of the second display in a direction opposite to the certain direction from an end point side based on the integrated value of failures.

2. The information processing apparatus according to claim 1, wherein the display control part is further configured to make a first display color that causes the display part to perform the display corresponding to the integrated value of successes differ from a second display color that causes the display part to perform the display corresponding to the integrated value of failures, and cause the display part to display an unprocessed section, which is displayed between the display corresponding to the integrated value of successes and the display corresponding to the integrated value of failures, in a display color different from the first display color and the second display color.

3. The information processing apparatus according to claim 1, wherein the display control part is further configured to set one end side of a bar-shaped display object as the start point side, set the other end side of the bar-shaped display object as the end point side, cause the display part to perform the display corresponding to the integrated value of successes, which has been read out, from the one end side in one direction in which the bar-shaped display object extends, and cause the display part to perform the display corresponding to the integrated value of failures, which has been read out, from the other end side in a direction opposite to the one direction.

4. The information processing apparatus according to claim 1, wherein the display control part is further configured to set a position of 12 o'clock of a circle-shaped display object as a start point of the start point side and a start point of the end point side, cause the display part to perform the display corresponding to the integrated value of successes, which has been read out, in a clockwise direction (or in a counterclockwise direction) from the position of 12 o'clock, and cause the display part to perform the display corresponding to the integrated value of failures, which has been read out, in the counterclockwise direction (or in the clockwise direction) from the position of 12 o'clock.

5. The information processing apparatus according to claim 4, wherein the display control part is further configured to display a total amount of an overall progress of file transfers on the display part so as to be superimposed on the circle-shaped display object.

6. The information processing apparatus according to claim 5, wherein the total amount of the overall progress is displayed as a percentage inside the circle-shaped display object to indicate a combined value of the integrated value of successes and the integrated value of failures relative to a total number to files to be transferred.

7. The information processing apparatus according to claim 4, wherein the display control part is further configured to display a number corresponding to the integrated value of successes, which has been read out, and a number corresponding to the integrated value of failures, which has been read out, on the display part together with the circle-shaped display object.

8. The information processing apparatus according to claim 4, wherein the display control part is further configured to display a thumbnail indicating the transfer file and a thumbnail indicating a corresponding transfer status together on the display part.

9. The information processing apparatus according to claim 1, wherein the display control part is further configured to cause the display part to perform the display corresponding to the integrated value of successes, cause the display part to perform the display corresponding to the integrated value of failures, and cause the display part to perform a display corresponding to an integrated value of unprocessed file transfer and a display corresponding to an integrated value of under file transferring at a display area sandwiched between the display corresponding to the integrated value of successes and the display corresponding to the integrated value of failures.

10. The information processing apparatus according to claim 9, wherein the display control part is further configured to cause the display part to display the display under file transferring so as to be in contact with the display corresponding to the integrated value of successes, which is displayed on the display part.

11. The information processing apparatus according to claim 1,
wherein the processor further causes the display part to display, together with the first display and the second display, information indicating a transfer file and a corresponding transfer status of the transfer file; and
wherein the total amount of an overall progress is displayed above the information indicating the transfer file and the corresponding transfer status.

12. A control method for an information processing apparatus including a display part that displays an overall progress of a transfer processing of transmitting and transferring transfer files received from an electronic device to a file server, the control method comprising:
an integration step of obtaining an integrated value of successes and an integrated value of failures of the transfer processing of transmitting the received transfer files to the file server;
a storage step of storing the integrated value of successes and the integrated value of failures, which are obtained in the integration step; and
a display control step of reading out the integrated value of successes and the integrated value of failures, which are stored in the storage step, causing the display part to perform a first display corresponding to the integrated value of successes, which has been read out, and changing a progression of the first display in a certain direction from a start point side based on the integrated value of successes, and causing the display part to perform a second display corresponding to the integrated value of failures, which has been read out, and changing a progression of the second display in a direction opposite to the certain direction from an end point side based on the integrated value of failures.

13. A non-transitory computer-readable storage medium storing a program for causing a computer to execute a control method for an information processing apparatus including a display part that displays an overall progress of a transfer processing of transmitting and transferring transfer files received from an electronic device to a file server, the control method comprising:
an integration step of obtaining an integrated value of successes and an integrated value of failures of the transfer processing of transmitting the received transfer files to the file server;
a storage step of storing the integrated value of successes and the integrated value of failures, which are obtained in the integration step; and
a display control step of reading out the integrated value of successes and the integrated value of failures, which are stored in the storage step, causing the display part to perform a first display corresponding to the integrated value of successes, which has been read out, and changing a progression of the first display in a certain direction from a start point side based on the integrated value of successes, and causing the display part to perform a second display corresponding to the integrated value of failures, which has been read out, and changing a progression of the second display in a direction opposite to the certain direction from an end point side based on the integrated value of failures.

* * * * *